United States Patent
Hassan et al.

(10) Patent No.: US 10,432,355 B2
(45) Date of Patent: Oct. 1, 2019

(54) ENHANCED ERROR PROTECTION FOR HIGH PRIORITY COMMUNICATION SESSIONS

(71) Applicant: Microsoft Technology Licensing, LLC, Redmond, WA (US)

(72) Inventors: Amer Aref Hassan, Kirkland, WA (US); Bradford R. Clark, Lyons, CO (US); Michael Travis Gilbert, Thornton, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 15/619,362

(22) Filed: Jun. 9, 2017

(65) Prior Publication Data
US 2018/0359053 A1     Dec. 13, 2018

(51) Int. Cl.
| H04L 1/00 | (2006.01) |
| H04W 4/90 | (2018.01) |
| H04L 29/08 | (2006.01) |

(52) U.S. Cl.
CPC .......... *H04L 1/0057* (2013.01); *H04L 1/0068* (2013.01); *H04L 69/324* (2013.01); *H04L 69/329* (2013.01); *H04W 4/90* (2018.02)

(58) Field of Classification Search
CPC ... H04L 1/0001; H04L 1/0057; H04L 1/0068; H04L 5/00; H04L 1/0061; H04L 1/0064;
(Continued)

(56) References Cited

U.S. PATENT DOCUMENTS 6,697,422 B1 * 2/2004 Mathai .................... H04L 1/001
                                                                        370/329
9,380,609 B2 * 6/2016 Chaponniere ........... H04W 4/90
(Continued)

FOREIGN PATENT DOCUMENTS

EP        3076691 A1 *  5/2016  .......... H03M 3/5116

OTHER PUBLICATIONS

Clark, et al., "Guidelines for Considering New Performance Metric Development", https://tools.ietf.org/html/rfc6390, Published on: Oct. 2011, pp. 1-23.
(Continued)

*Primary Examiner* — Shelly A Chase
(74) *Attorney, Agent, or Firm* — Schwegman Lundberg & Woessner, P.A.

(57) ABSTRACT

Techniques for enhanced error protection for high priority communication sessions are described. Generally, the described techniques enhance error protection for high priority communication sessions, such as emergency calling, such that the high priority communication sessions are essentially error free. According to various implementations, user input to initiate a communication session over a network is received at a communication application. In response to detecting that the communication session corresponds to a high priority communication session, error protection for data of the high priority communication session is enhanced. The data may be enhanced in a variety of different ways, such as by performing forward error correction on the data. The enhanced data of the high priority communication session is then communicated over the network to an endpoint.

18 Claims, 8 Drawing Sheets

(58) Field of Classification Search
CPC ........ H04L 69/329; H04L 69/40; H04W 4/10;
H04W 4/90; H04W 72/10; H04W 72/087
See application file for complete search history.

(56) References Cited

U.S. PATENT DOCUMENTS

| | | |
|---|---|---|
| 2007/0190968 A1 | 8/2007 | Dickinson et al. |
| 2010/0202368 A1 | 8/2010 | Hans |
| 2010/0255826 A1* | 10/2010 | Brewer .................. H04W 4/10 455/414.1 |
| 2011/0225479 A1 | 9/2011 | Hassan et al. |
| 2014/0140247 A1 | 5/2014 | Venkata |
| 2015/0029836 A1 | 1/2015 | Hans |
| 2015/0163352 A1 | 6/2015 | Ritter et al. |
| 2016/0227524 A1* | 8/2016 | Choi ......................... H04L 5/00 |
| 2017/0026874 A1 | 1/2017 | Hassan et al. |

OTHER PUBLICATIONS

"Plan for emergency services in Skype for Business Server 2015", https://technet.microsoft.com/en-us/library/dn951423.aspx, Published on: May 25, 2016, 6 pages.

* cited by examiner

500

ENHANCED ERROR PROTECTION FOR HIGH PRIORITY COMMUNICATION SESSIONS

BACKGROUND

Many devices today utilize some form of wireless data communication. While a variety of different types of wireless data communication exist, radio frequency (RF) communication is pervasive. Examples of RF communication include wireless cellular networks (e.g., for cell phones), broadband wireless (e.g., Wi-Fi®), broadcast television, global positioning system (GPS) navigation, and so forth. Notably, the reliability of placing an emergency call over a telephone network (and in certain geographies over a data network) is important, as ensuring that the emergency call is reliable may literally be a matter of life and death. As such, regulators in many countries require a higher level of performance for placing emergency calls.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for increasing the quality of communication through enhanced error protection for high priority communication sessions are described. Generally, the described techniques enhance error protection for high priority communication sessions, such as emergency calling. According to various implementations, user input to initiate a communication session over a network is received at a communication application implemented at a client device. In response to detecting that the communication session corresponds to a high priority communication session, error protection for data of the high priority communication session is enhanced between the communication application and a communication service. The data may be enhanced in a variety of different ways, such as by performing forward error correction on the data. The enhanced data of the high priority communication session is then communicated over the network to the communication service.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
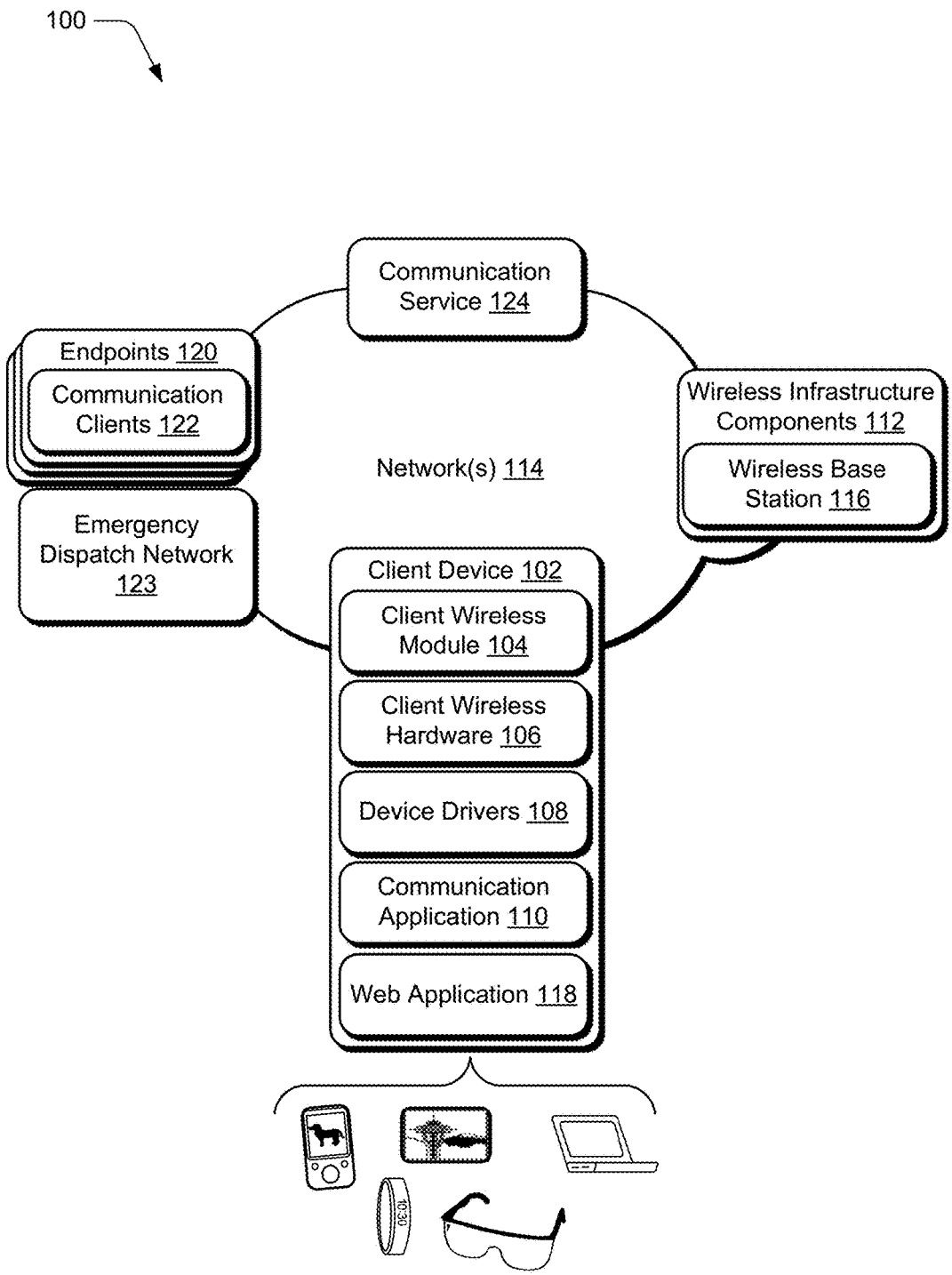
FIG. 1 is an illustration of an environment in an example implementation that is operable to employ techniques discussed herein in accordance with one or more embodiments.

Techniques for increasing the quality of communication through enhanced error protection for high priority communication sessions are described. Unlike conventional solutions which use the same error protection (e.g., error-correction coding and modulation) for high priority communication sessions as regular communication sessions, the described techniques dynamically enhance error protection for high priority communication sessions, such as emergency calling. Doing so increases the reliability and robustness of high priority communication sessions. Notably, in the case of high priority emergency calls, lives may depend on the reliability of the emergency call reaching the emergency dispatch network with low error rates. Furthermore, by dynamically adjusting the error protection, battery life for the device is conserved as the enhanced encoding, which may utilize increased processing and battery resources, is not applied to regular communication sessions According to various implementations, user input to initiate a communication session over a network is received at a communication application implemented at a device. In response to detecting that the communication session corresponds to a high priority communication session, error protection for data of the high priority communication session is enhanced between the communication application and a communication service. The data may be enhanced in a variety of different ways, such as by performing forward error correction on the data. The enhanced data of the high priority communication session is then communicated over the network to the communication service, which decodes and forwards the enhanced data to an endpoint (e.g., an emergency dispatch network).

In one or more implementations, the error protection of the data of the high priority communication session is enhanced at an application layer, between the communication application and a communication service, by performing forward error correction on the data. To do so, the data of the high priority communication session can be encoded with an error-correcting code that encodes the data with a maximum redundancy available for a communication channel between the communication application and the communication service. In some instances, the data of the high priority communication session is encoded using systematic forward error correction encoding. The communication application then receives and decodes the encoded data, and forwards the decoded data to an endpoint, such as an emergency dispatch network.

In one or more implementations, error protection for data of the high priority communication session is enhanced at both the application layer between the communication application and the communication service and at a physical and link layer between the client device and a base station. In this implementation, a device driver of the client device is instructed to communicate the data of the high priority communication session to the base station using one or more modified wireless parameters, such as a lowest order modulation scheme and a lowest rate of error control coding.

In one or more implementations, the described techniques detect a high priority communication session when user input is received to place an emergency call, such as when a user dials "911" on an interface of the communication application. In response, error protection for the data of the emergency call is enhanced and communicated to an emergency dispatch network over the network.

Notably, enhancing error protection of data of high priority communication sessions may require additional processing resources resulting in a greater drain on battery life of the client device. Generally, for high priority communication sessions such as emergency calling, this may be an acceptable tradeoff in order to ensure that the data is reliably communicated. However, in one or more implementations, in order to further improve battery life of the client device, the level of error protection enhancement is dynamically adjusted based on the quality of the communication channel. To do so, channel conditions of the network are periodically monitored, and a reliability metric indicating the current channel conditions is generated and maintained. In this implementation, a level of error protection enhancement is selected based on the reliability metric. For example, if the current channel conditions are poor, then the highest level of error enhancement is applied. However, if the current channel conditions are good, then a low level of error enhancement (or none at all) is applied to the data.

In one or more implementations, the communication application can be implemented to provide enhanced error protection for high priority communication sessions other than just emergency calls. For instance, the communication application may provide enhanced error protection for a particular type of communication session (e.g., business calls), or for a particular person (e.g., the user's spouse). Furthermore, in one or more implementations, the described techniques may provide the enhanced error protections based on the reliability metric. For instance, if the reliability metric indicates the communication channel is poor (or below a particular threshold), the enhanced error protection techniques may be applied for all communication sessions.

Example Environment

FIG. 1 is an illustration of an environment 100 in an example implementation that is operable to employ techniques for enhanced error protection for high priority communication sessions in accordance with one or more implementations. Environment 100 includes a client device 102 which can be embodied as any suitable device such as, by way of example and not limitation, a smartphone, a tablet computer, a wearable computing device, a portable computer (e.g., a laptop), a desktop computer, and so forth. One of a variety of different examples of a client device 102 is shown and described below in FIG. 8.

The client device 102 of FIG. 1 is illustrated as including a client wireless module 104, which is representative of functionality to enable the client device 102 to communicate wirelessly with other devices and/or entities. The client wireless module 104 is configured to enable data communication via one or more of a variety of different wireless techniques and protocols. Examples of such techniques and/or protocols include wireless cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16 or 802.22), telephone networks, data networks, and so on.

The client device 102 further includes client wireless hardware 106, which is representative of various hardware components that can be employed to enable the client device 102 to communicate wirelessly. Examples of the client wireless hardware 106 include radio transmitters, radio receivers, various types and/or combinations of antennas, impedance matching functionality, and so on. In at least some embodiments, the client device 102 is a multi-radio device that can communicate via different wireless technologies and/or protocols. For instance, the client wireless hardware 106 may include multiple antennas that are individually configured for different wireless technologies. The client wireless hardware 106, for example, may include a first antenna configured for cellular communications (e.g., Long-Term Evolution (LTE), 5G, and so forth), and a second antenna that is configured for wireless broadband, e.g., WiFi®.

Further included as part of the client device 102 are one or more device drivers 108, which are representative of functionality to enable the client device 102 to interact with various devices, and vice-versa. For instance, the device drivers 108 can enable interaction between various functionalities of the client device 102 (e.g., an operating system, applications, services, and so on) and different devices of the client device 102, such as input/output (I/O) devices. The device drivers 108, for instance, can enable interaction between the client wireless module 104 and the client wireless hardware 106 to enable the client device 102 to transmit and receive wireless signals.

In at least some embodiments, the client device 102 is configured to communicate with other devices and/or entities via a communication application 110. Generally, the communication application 110 is representative of functionality to enable different forms of communication via the client device 102. Examples of the communication application 110 include a voice communication application (e.g., a Voice over Internet Protocol (VoIP) client), a video communication application, a messaging application, a content sharing application, a Unified Communications (UC) application, and combinations thereof. The communication application 110, for instance, enables different communication modalities to be combined to provide diverse communication scenarios.

The environment 100 further includes wireless infrastructure components 112, which are representative of components that implement wireless portions of network(s) 114. In at least some implementations, the wireless infrastructure components 112 may serve as gateways between wired and wireless portions of the network(s) 114. Examples of the wireless infrastructure components 112 include wireless base stations (e.g., wireless access points (WAPs)), routers, gateways, switches, and so forth. Included as part of the wireless infrastructure components 112 is a wireless base station 116, which is representative of an access point for the client device 102 to connect wirelessly to the network 114.

The wireless base station 116 may be implemented in various ways, such as a wireless broadband access point, a wireless cellular base station, and so forth.

Generally, the network 114 is representative of a single network or a combination of different interconnected networks. In at least some implementations, the network 114 represents different portions of the radio spectrum that may be leveraged for wireless communication. The network 114, for instance, represents radio spectrum in different frequency bands, such as ultra-high frequency (UHF), super-high frequency (SHF), and so forth. The network 114 may also represent a combination of wireless and wired networks and may be configured in a variety of ways, such as a wide area network (WAN), a local area network (LAN), the Internet, and so forth.

According to various implementations, the communication application 110 includes one or more modules or functionality configured to perform various aspects of techniques for enhanced error protection for high priority communication sessions. For instance, the communication application 110 and/or client wireless module 104 may detect user input to initiate a high priority communication session, such as an emergency call, over network 114. In response to detecting that the communication session corresponds to a high priority communication session, the communication application 110 enhances error protection for data of the high priority communication session. The data may be enhanced in a variety of different ways, such as by performing forward error correction on the data. The client device 102 then communicates the enhanced data of the high priority communication session over network 114 to an endpoint 120. Example ways in which the communication application 110 and client wireless module 104 may detect high priority communication sessions and trigger enhanced error protection in response to detecting a high priority communication session are detailed below.

The client device 102 further includes a web application 118, which is representative of an application that is configured to perform various tasks via connection to the network 114. The web application 118, for instance, can interact with various network-based entities to perform various tasks, such as presentation of web content, interaction with web-based resources, communication with other entities, and so forth. Examples of the web application 118 include a web browser, a web-enabled enterprise application, a web-enabled productivity application, and so forth.

The environment 100 further includes endpoints 120, which are representative of entities with which the client device 102 may exchange data via data transmission. The endpoints 120, for instance, represent other end-user client devices with which the client device 102 may communicate. This is not intended to be limiting, however, and the endpoints 120 may be implemented as other network-connected entities, such as a web server, a cloud-based service, a content sharing service, and so forth.

The endpoints 120 include communication clients 122, which in at least some implementations represent different instances of the communication application 110. Communication between the client device 102 and the endpoints 120, for instance, may be facilitated via communication between the communication application 110 and the communication clients 122.

In at least some implementations, the endpoints 120 correspond to an emergency dispatch network 123 which is configured to receive emergency calls, such as when the user dials "911", and route the emergency calls to emergency responders, such as police, fire department, ambulances, and so forth.

In at least some implementations, a communication service 124 is leveraged to manage communication between the client device 102 and the endpoints 120, such as emergency dispatch network 123. The communication service 124, for instance, is representative of a network service that performs various tasks for management of communication between the client device 102 and the endpoints 120. For example, the communication service 124 can manage initiation, moderation, and termination of communication sessions between the communication application 110 and the communication clients 122.

Having described an example environment in which the techniques described herein may operate, consider now a discussion of some example implementation scenarios for enhanced error protection for high priority communication sessions in accordance with one or more implementations.

Example Implementation Scenarios

The following section describes example implementation scenarios for enhanced error protection for high priority communication sessions. The implementation scenarios may be implemented in the environment 100 discussed above, the system 800 described below, and/or any other suitable environment.

Figure 2:
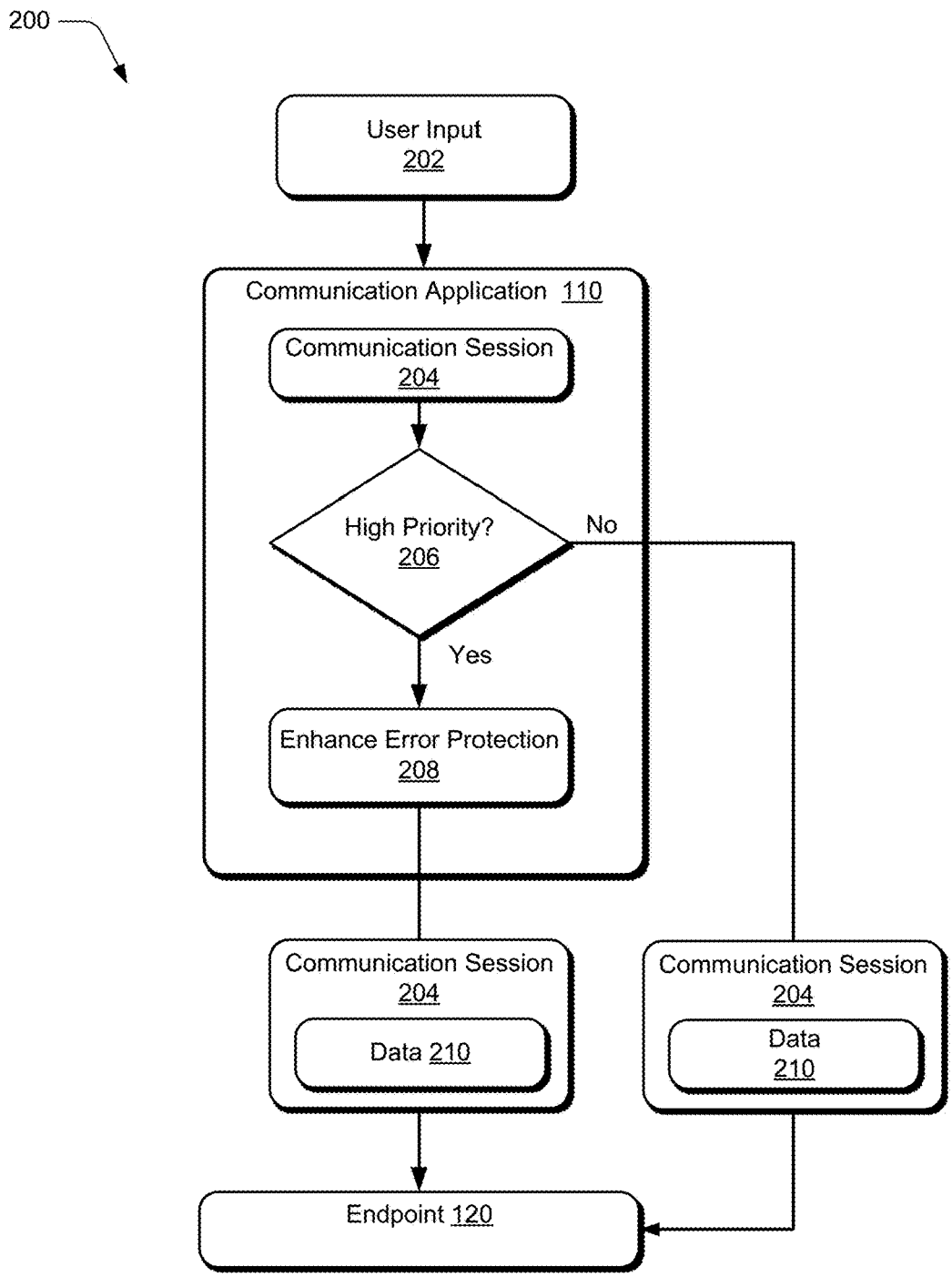
FIG. 2 illustrates an example implementation scenario for techniques for enhanced error protection for high priority communication sessions in accordance with one or more implementations.

FIG. 2 depicts an example implementation scenario 200 for techniques for enhanced error protection for high priority communication sessions in accordance with one or more implementations. While the scenario 200 is illustrated as being implemented in the environment 100 introduced above, it is to be appreciated that various aspects of the scenario 200 may be in any other suitable environment.

In the scenario 200, user input 202 to initiate a communication session 204 with an endpoint 120 is received by a communication application 110 implemented at client device 102. For example, the user selects an indicia indicating a request to initiate an audio call, such as by entering a phone number for an endpoint 120, into an interface of communication application 110 or by selecting a call icon displayed on the interface of the communication application 110.

At 206, client device 102 determines whether the communication session 204 is a high priority communication session. For example, communication application 110 determines whether the communication session 204 is a high priority communication session. In one or more implementations, the communication application 110 detects that the communication session 204 is a high priority communication session in response to detecting that the user input is to place an emergency call to emergency dispatch network 123, such as when the user dials an emergency phone number (e.g., "911") into a user interface of the communication application 110 or by selecting an emergency call icon.

If the communication session 204 is determined to be a high priority communication session, then at 208 communication application 110 of client device 102 enhances error protection for data 210 of the communication session 204, and initiates communication of the data 210 of the high priority communication session 204 with the enhanced error protection to the endpoint 120. For example, in the cases of an emergency call, the data of the emergency call is communicated with enhanced error protection to the emergency dispatch network 123 over the network 114. Alternately, if it is determined that the communication session is not high priority, then the data 210 of the communication session 204 is communicated to the endpoint 120 without enhanced error protection.

As part of establishing the high priority communication session, the client device 102 may communicate (e.g., transmit and receive) the data 210 via connection to the network 114. The client device 102, for instance, associates with the wireless base station 116, which provides the client device 102 with wireless connectivity to the network 114 to transmit and receive the data 210. As referenced above, the wireless base station 116 may represent any type of infrastructure component that provides wireless connectivity, such as a wireless cellular base station, a wireless broadband access point (e.g., a WiFi® AP), and so forth. The data 210, for instance, may represent wireless cellular data, wireless broadband data, and/or combinations thereof.

The data 210 may be implemented in various ways. For instance, the data 210 may include communication data as part of a communication session between the client device 102 and an endpoint 120. Examples of such a communication session include a voice call (e.g., a wireless cellular call), voice data (e.g., VoIP data), video communication data, and combinations thereof. Alternatively or additionally, the data 210 may include web content, such as web page content, web application 118 content, and so forth. Thus, the data 210 generally represents any type of data that may be communicated over a network.

In at least some implementations, the data 210 may be part of a communication session between the client device 102 and an endpoint 120. The data 210, for instance, may be exchanged between the communication application 110 and a communication client 122 at the endpoint 120 and/or emergency dispatch network 123. The communication service 124 may assist in exchange of the data 210, such as by moderating and/or managing communication of the data 210 between the communication application 110 and a communication client 122 or the emergency dispatch network 123, in the case of an emergency call.

In one or more implementations, the communication application 110 enhances error protection for the data of the high priority communication session at an "application layer" between the communication application 110 and the communication service 124.

Figure 3:
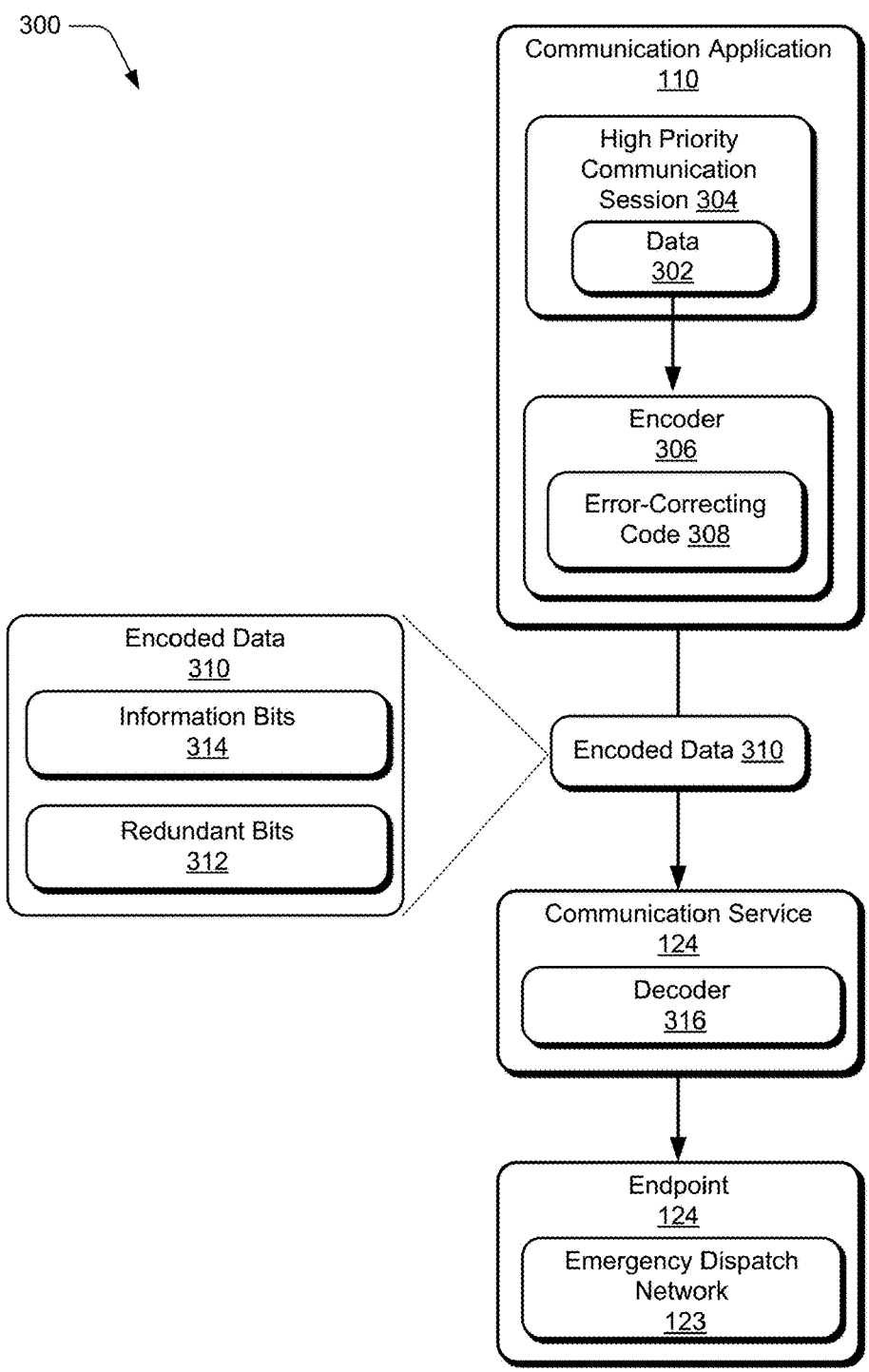
FIG. 3 illustrates an example implementation scenario for techniques for enhanced error protection for high priority communication sessions in accordance with one or more implementations.

As an example, consider FIG. 3 which illustrates an example implementation scenario for techniques for enhanced error protection for high priority communication sessions in accordance with one or more implementations.

In scenario 300, client wireless module 104 at client device 102 obtains data 302 associated with a high priority communication session 304. Notably, when a communication session is initiated using communication application 110, the communication application 110 is aware that the communication session is high priority. For example, if the user places an emergency call, such as by dialing "911" using communication application 110, the communication application 110 is aware that the user has placed an emergency call.

In response to detecting high priority communication session 304, the communication application 110 enhances error protection for the data 302 of the high priority communication session 304 by performing forward error correction (FEC) on the data 302. To do so, the data 302 is passed to an encoder 306. The encoder 306 encodes the data 302 with an error-correcting code (ECC) 308 to generate encoded data 310. In one or more implementations, the error-correcting code 308 is a block code (e.g., a Golay code), however other ECCs are also contemplated. Generally, the error-correcting code 308 encodes the data 302 by applying an algorithm which adds redundant bits 312 to information bits 314 of the data. This redundancy enables the communication service 124 to correct errors in the encoded data 310 of the high priority communication session 304 using the redundant bits 312 without requiring a retransmission of the data.

In one or more implementations, the encoder 306 encodes the data 302 with a maximum redundancy available for the communication channel from the client device 102 to the communication service 124. As described herein, a maximum redundancy corresponds to encoding the data with the maximum number of redundant bits 312.

For example, a redundancy of 1:3, means that each information bit 314 includes 2 redundant bits 312, such that encoded data with 5 information bits includes 15 total bits. Continuing with this example, a redundancy of 1:4 means that each information bit 314 includes 3 redundant bits 312, such that encoded data with 5 information bits would include a total of 20 bits. In this scenario, a 4:1 redundancy is higher than a 3:1 redundancy because it includes a higher number of redundant bits.

Notably, increasing the number of redundant bits enhances the error protection for the data 302 because the greater number of redundant bits 312 increases the likelihood that any errors in the encoded data 310 may be corrected at the communication service 124 by a redundant bit 312.

In one or more implementations, the encoder 306 is configured to dynamically adjust the redundancy of the error-correcting code 308 using punctured coding such that the highest redundancy available to the communication channel between the client device 102 and the communication service 124 is selected by the client wireless module 104. Punctured coding, or puncturing, is the process of removing some of the redundant bits after encoding with an error-correcting code based on the redundancy available to the communication channel. Doing so has the same effect as encoding with an error-correcting code with a higher rate, or less redundancy. However, with puncturing the same decoder can be used regardless of how many bits have been punctured, thus puncturing considerably increases the flexibility of the system without significantly increasing its complexity by requiring additional hardware or software at the encoder or decoder.

In order to dynamically adjust the redundancy of error-correcting code 308 using punctured coding, the encoder 306 may apply an error-correcting code 308 with a maximum redundancy to the data 302. Then, based on the redundancy available to the communication channel, the encoder 306 removes excess redundant bits 312 from the encoded data 310. For example, if the data 302 is encoded using 1:4 encoding, but the maximum redundancy available to the channel is 1:3, then the encoder 306 removes one redundant bit 312 from each information bit 314 of the encoded data 310.

Client wireless module 104 then communicates the encoded data 310 to communication service 124. The communication service 124 receives the encoded data 310, and a decoder 316 decodes the encoded data 310 to obtain the information bits 314 of the encoded data 310. As discussed above, decoder 316 is able to decode the encoded data 310 regardless of the redundancy used for the encoding without making any changes to the hardware or software of the decoder.

The communication service 124 then routes the data of the high priority communication session 304 to the intended endpoint 120. For example, in the case of an emergency call, the communication service 124 routes the emergency call to the emergency dispatch network 123.

In one or more implementations, the encoder 306 encodes the data 302 using systematic FEC encoding. In systematic encoding, the information bits 314 of the encoded data 310 are always positioned at the same location with the encoded data 310. For example, the data 302 can be encoded such that the first 5 bits of the encoded data are always the information bits. In this way, the decoder 316 at communication service 124 knows exactly where the information bits 314 are positioned in the encoded data 310. Thus, communication service 124 can act on the information bits quickly without decoding the redundant bits in cases where there is no error detected in the encoded data 310. For example, if the decoder 316 decodes the first five information bits and determines that the encoded data 310 corresponds to an emergency call, then the emergency call can be immediately routed to the emergency dispatch network 123, without encoding the remainder of the encoded data 310, thereby improving the speed in which the emergency call is routed to the emergency dispatch network 123.

As discussed above, when a communication session is initiated using communication application 110, the communication application 110 is aware that the call is a high priority call. For example, if the user places an emergency call, such as by dialing "911" using communication application 110, the communication application 110 is aware that the user has placed an emergency call. However, the physical and link layer, between the client device 102 and the wireless base station 116, may have no knowledge of the fact that an emergency call is being placed. As such, even if the error protection of the data is enhanced at the application layer, errors may occur in the data transmitted from the client device 102 to the base station 116.

Thus, in one or more implementations, the communication application 110 enhances the error protection for the data of the high priority communication session at a first and second layer of the network 114. For example, the communication application 110 can enhance error protection for the data at both the application layer of the network (as discussed above with regards to FIG. 3), as well as at a physical and link layer of the network between the client device 102 and base station 116.

Figure 4:
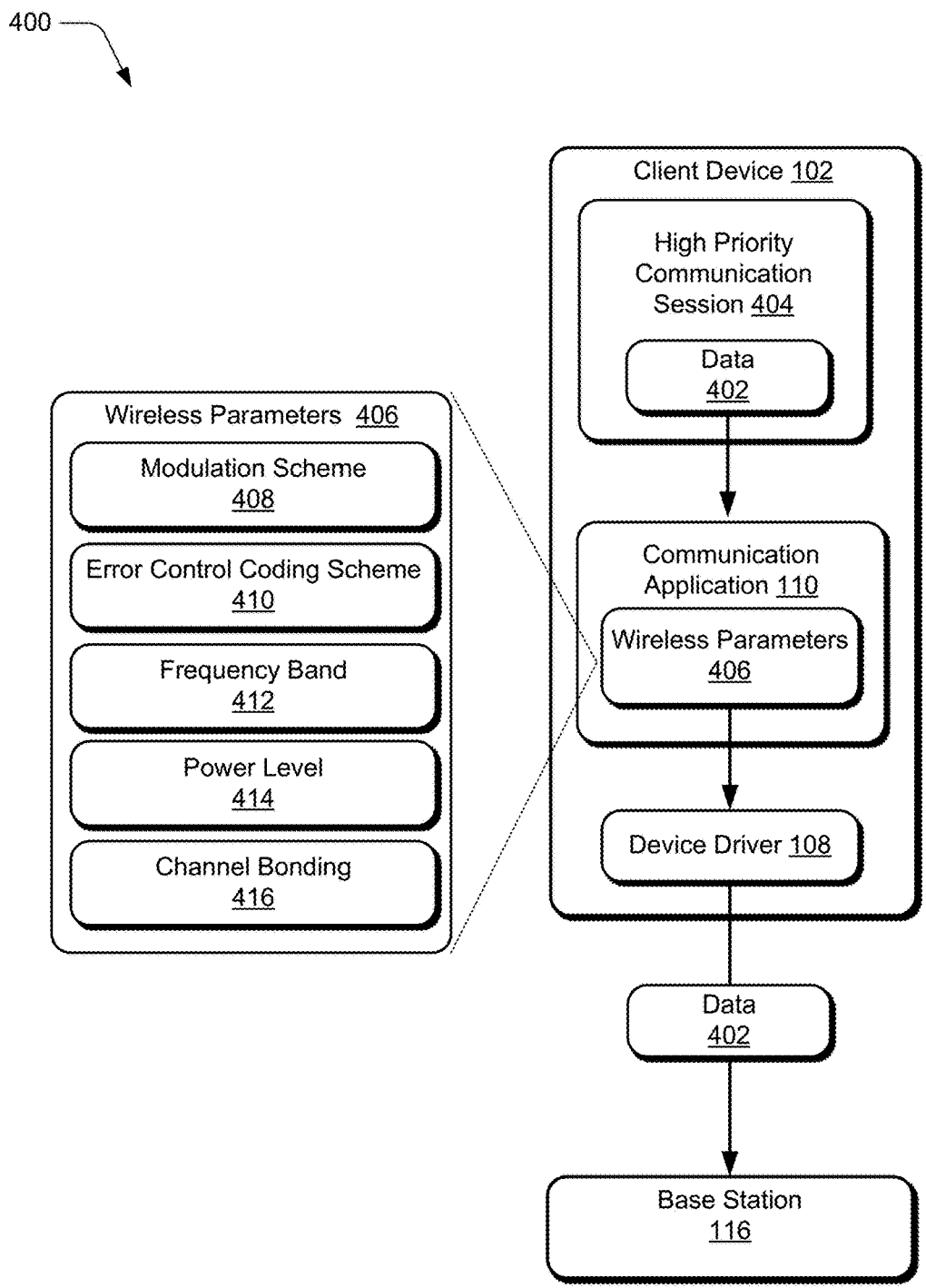
FIG. 4 illustrates an example implementation scenario for techniques for enhanced error protection for high priority communication sessions in accordance with one or more implementations.

Consider, for example, FIG. 4 which illustrates an example implementation scenario 400 for techniques for enhanced error protection for high priority communication sessions in accordance with one or more implementations.

In scenario 400, communication application 110 enhances the error protection for data 402 of a high priority communication session 404 at the physical and link layer between client device 102 and base station 116 by modifying one or more wireless parameters 406 used by client device 102 to communicate data 402 to base station 116. In one or more implementations, the communication application 110 modifies the wireless parameters 406 by instructing device driver 108 at client device 102 to communicate the data 402 to base station 116 using the modified wireless parameters 406. The instructions may cause the device driver 108 to modify one or more wireless parameters 406 which may include, by way of example and not limitation, a modulation scheme 408, an error control coding scheme 410, a frequency band 412, a power level 414, or channel bonding 416 of the data 402 transmitted to the base station 116.

Notably, modification of each of these wireless parameters 406 may improve the performance and reliability of the transmission of the data 402 at the physical and link layer of the network 114. The communication application 110 may instruct the device driver 108 to modify any combination of one or more of the wireless parameters 406. For example, in some cases, only the modulation scheme 408 and the error control coding scheme 410 is modified, while in other cases all of the wireless parameters 406 are modified.

In one or more implementations, the communication application 110 instructs the device driver 108 to modify the modulation scheme 408 of the data 402 to the lowest order modulation scheme that is available to the client device 102. The modulation scheme 408 controls the way in which the data 402 is mapped to the transmitted signal of data 402. Generally, in order to transmit data at very high data rates, the signal constellation (otherwise known as the signal set) is very large. The larger the number of signal sets, the higher power that is required in order to achieve the same error rate for the transmission of the data 402. As a default, many device drivers 108 attempt to transmit data at the highest order modulation rather than the lowest. However, using high order modulation increases the number of retransmissions as well as the packet error rate, which may be as high as $10^{-3}$ or $10^{-2}$. For high priority communication sessions, such as emergency calling, it is important to have a low error rate (e.g., $10^{-9}$). As such, modifying the modulation scheme 408 to a lowest order modulation scheme that is available decreases the error rate of the transmitted signal of data 402 from client device 102 to base station 116.

In one or more implementations, the communication application 110 instructs the device driver 108 to modify the error control coding scheme 410 of the data 402 (e.g., FEC) to the lowest rate of error control coding that is available. Doing so causes the data 302 to be transmitted to the wireless base station 116 with a high redundancy between data bits. Notably, communication schemes have different error control coding ranges. Consider, for example, in LTE that the available error control coding ranges anywhere from 1:4 (three redundant bits for every information bit) to 4:5 (one redundant bit for four information bits). Thus, using a low error control coding scheme 410 increases the number of redundant bits thereby increasing the likelihood that any errors in the data 402 can be corrected at base station 116.

In one or more implementations, the communication application 110 instructs the device driver 108 to modify the frequency band 412 to a low frequency band. Doing so, improves the range of base station 116 that can be reached by client device 102 thereby increasing the likelihood that the data 402 can be communicated to a base station 116 that is within range to client device 102.

In one or more implementations, the communication application 110 instructs the device driver 108 to modify the power level 414 to a maximum power level. Modifying the power level 414 to a maximum power level increases the likelihood that the data 402 will be received by base station 116 without any errors.

In one or more implementations, the communication application 110 instructs the device driver 108 to implement channel bonding 416. Doing so enables additional information to be included with the data 402, such as a current geographical location of client device 102.

Notably, enhancing error protection of data of high priority communication sessions, as described throughout, may require additional processing resources resulting in a greater drain on battery life of client device 102. Generally, for high priority communication sessions such as emergency calling, this is an acceptable tradeoff in order to ensure that the data is reliably communicated. However, in some cases, in order to improve battery life of the client device by decreasing processing resources, the communication application 110 dynamically adjusts the level of error enhancement for high priority communication sessions based on the quality of the communication channel.

Figure 5:
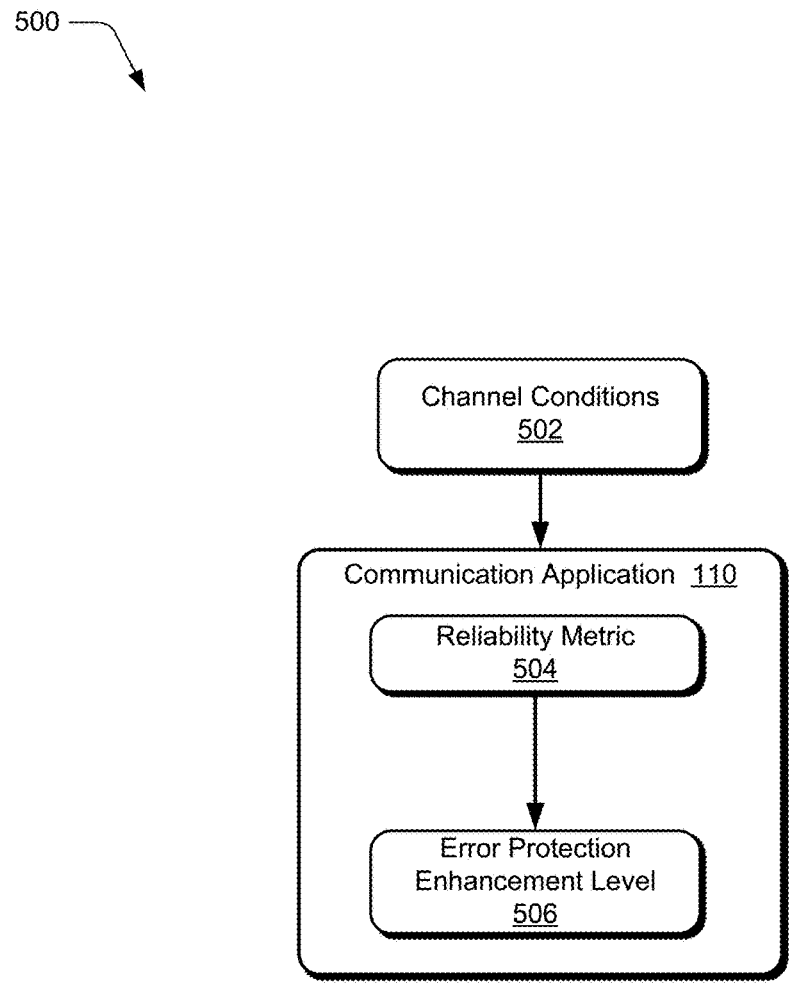
FIG. 5 illustrates an example implementation scenario for techniques for enhanced error protection for high priority communication sessions in accordance with one or more implementations.

Consider, for example, FIG. 5 which illustrates an example implementation scenario 500 for techniques for enhanced error protection for high priority communication sessions in accordance with one or more implementations.

In this example, the communication application 110 periodically monitors channel conditions 502 of the network 114, and generates and maintains a reliability metric 504 which indicates the current channel conditions. For example, the reliability metric 504 may be measured and generated during other communication sessions over the network 114. Generally, the reliability metric 504 characterizes the quality of the current communication channel of network 114, such as good, medium, or poor.

In this scenario, when a high priority communication session is detected, the communication application 110 obtains the reliability metric 504, and selects an of error protection enhancement level 506 based on the reliability metric 504. For example, if the current channel conditions are poor, then the highest error protection enhancement level 506 is applied, if the current channel conditions are medium, then a medium error protection enhancement level 506 is applied, and if the current channel conditions are good, then a low error protection enhancement level (or none at all) is applied to the data. The different error protection enhancement levels may modify the redundancy of the FEC, the level of modulation, and so forth. In this way, a lower error protection enhancement level 506 which requires less processing resources is applied when channel conditions are good, thereby conserving battery life of client device 102.

In one or more implementations, separate reliability metrics 504 may be determined and maintained for both the application layer between communication application 110 and communication service 124 and at the physical and link layer between client device 102 and base station 116.

Having discussed various example implementation scenarios, consider now some example procedures in accordance with one or more implementations.

Example Procedures

The following discussion describes some example procedures for enhanced error protection for high priority communication sessions in accordance with one or more implementations. The example procedures may be employed in the environment 100 of FIG. 1, the system 800 of FIG. 8, and/or any other suitable environment. The procedures, for instance, represent example procedures for implementation of the scenarios described above. In at least some implementations, the steps described for the various procedures can be implemented automatically and independent of user interaction. According to various implementations, the procedures may be performed by the client device 102, communication application 110, client wireless module 104, base station 116, and/or communication service 124.

Figure 6:
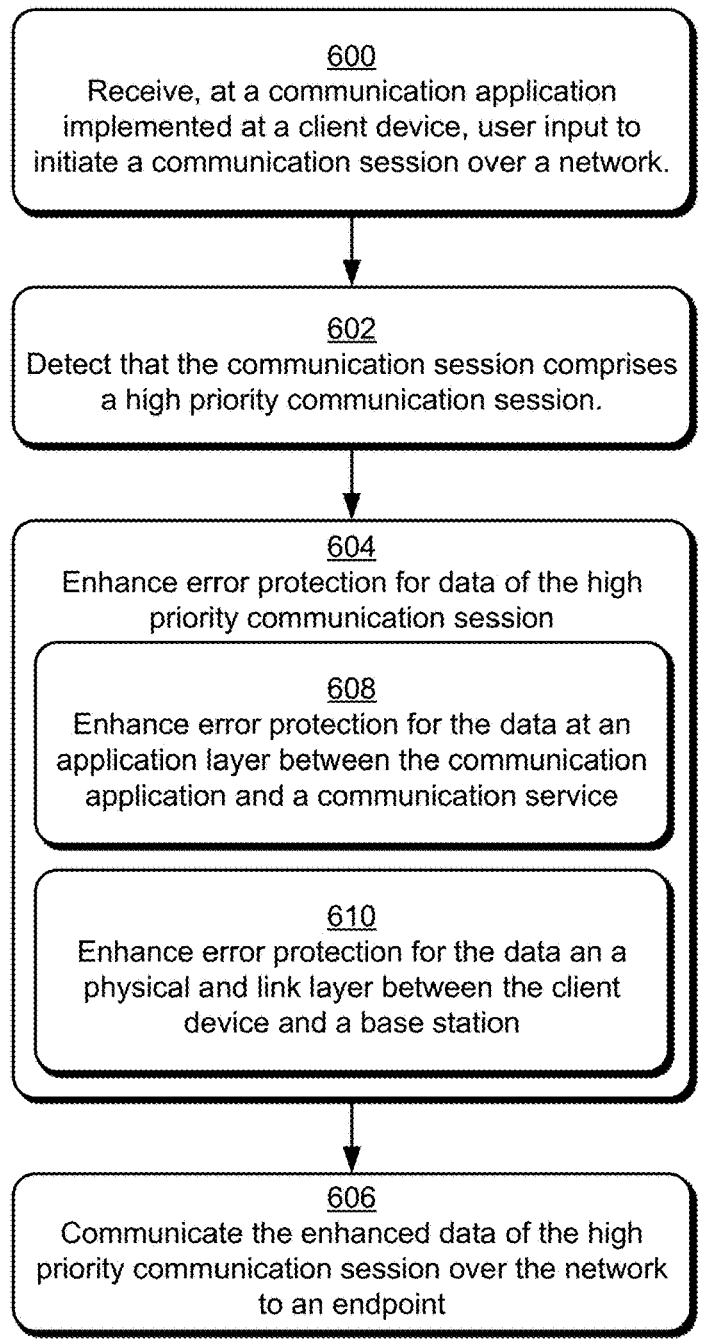
FIG. 6 is a flow diagram that describes steps in a method for enhanced error protection for high priority communication sessions in accordance with one or more implementations.

FIG. 6 is a flow diagram that describes steps in a method in accordance with one or more implementations. The method, for instance, describes an example procedure for enhancing error correction for high priority communication sessions in accordance with one or more implementations.

Step 600 receives, at a communication application implemented at a client device, user input to initiate a communication session over a network. For example, user input 202 to initiate a communication session 204 with an endpoint 120 is received by a communication application 110 implemented at client device 102.

Step 602 detects that the communication session comprises a high priority communication session. For example, communication application 110 detects that the communication session 204 is a high priority communication session. In one or more implementations, the communication application 110 detects that the communication session 204 is a high priority communication session in response to detecting that the user input is to place an emergency call to emergency dispatch network 123, such as when the user dials an emergency phone number (e.g., "911") into a user interface of the communication application 110 or by selecting an emergency call icon.

In response to detecting that the communication session comprises a high priority communication session, step 604 enhances error protection for data of the high priority communication session, and step 606 communicates the enhanced data of the high priority communication session over the network to an endpoint. In the case of an emergency call, the data of the emergency call is communicated with enhanced error protection to the emergency dispatch network 123 over the network 114. Alternately, if it is determined that the communication session is not high priority, then the data 210 of the communication session 204 is communicated to the endpoint 120 without enhanced error protection.

In one or more implementations, step 604 further includes step 608 and/or step 610. Step 608 enhances error protection for the data at an application layer between the communication application and a communication service. For example, the communication application 110 enhances error protection for the data of the high priority communication session at an "application layer" between the communication application 110 and the communication service 124 by performing forward error correction (FEC) on the data 302. To do so, the data 302 is passed to an encoder 306. The encoder 306 encodes the data 302 with an error-correcting code (ECC) 308 to generate encoded data.

Alternately or additionally, step 610 enhances error protection for the data at a physical and link layer between the client device and a base station. For example, communication application 110 enhances the error protection for data 402 of a high priority communication session 404 at the physical and link layer between client device 102 and base station 116 by modifying one or more wireless parameters 406 used by client device 102 to communicate data 402 to base station 116.

Figure 7:
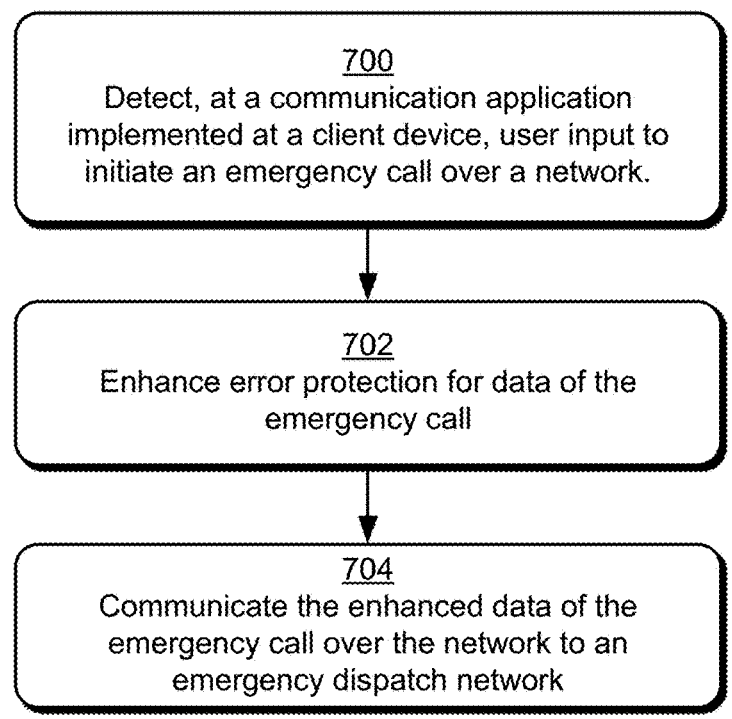
FIG. 7 is a flow diagram that describes steps in a method for enhanced error protection for emergency calls in accordance with one or more implementations.

FIG. 7 is a flow diagram that describes steps in a method in accordance with one or more implementations. The method, for instance, describes an example procedure for enhancing error correction for emergency calls in accordance with one or more implementations.

Step 700 detects, at a communication application implemented at a client device, user input to initiate an emergency call over a network. For example, communication application 110 detects user input to initiate an emergency, such as when the user dials an emergency phone number (e.g., "911") into a user interface of the communication application 110 or by selecting an emergency call icon.

In response to detecting the emergency call, step 702 enhances error protection for data of the emergency call, and step 704 communicates the enhanced data of the emergency call over the network to an emergency dispatch network. For example, communication application 110 enhances error protection for the emergency call, such as by performing FEC on the data of the emergency call. The enhanced data of the emergency call is then communicated over the network 114 to emergency dispatch network 123.

Example System and Device

Figure 8:
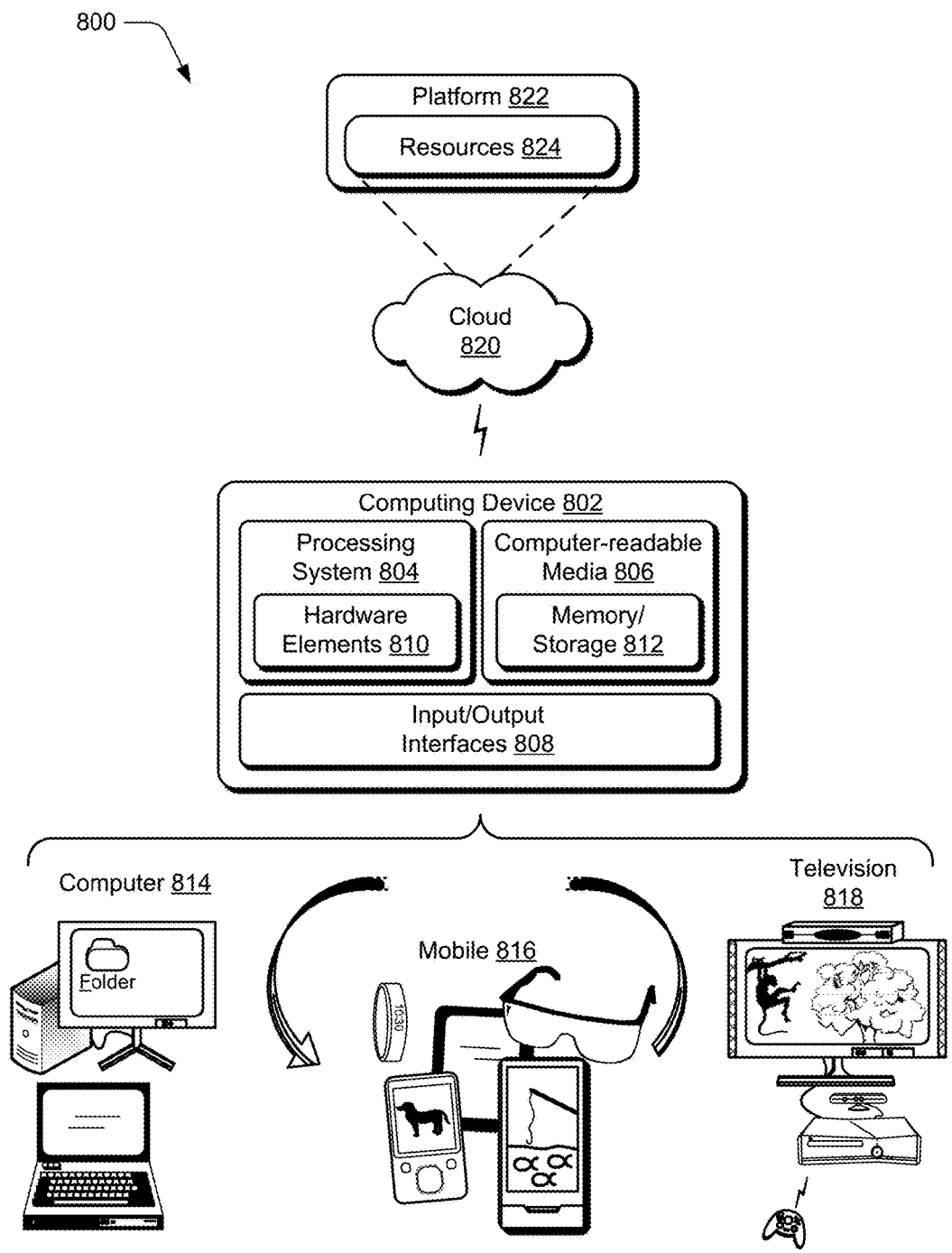
FIG. 8 illustrates an example system and computing device as described with reference to FIG. 1, which are configured to implement various aspects of the techniques described herein.

FIG. 8 illustrates an example system generally at 800 that includes an example computing device 802 that is representative of one or more computing systems and/or devices that may implement various techniques described herein. For example, the client device 102 discussed above with reference to FIG. 1 can be embodied as the computing device 802. The computing device 802 may be, for example, a server of a service provider, a device associated with the client (e.g., a client device), an on-chip system, and/or any other suitable computing device, apparatus, and/or computing system.

The example computing device 802 as illustrated includes a processing system 804, one or more computer-readable media 806, and one or more I/O Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as an module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, wearable device, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the client device 102, the communication service 124, and/or the quality service 126 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi™ network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Example implementations described herein include, but are not limited to, one or any combinations of one or more of the following examples.

In one or more examples, a computer-implemented method comprises: receiving, at a communication application implemented at a client device, user input to initiate a communication session over a network; detecting that the communication session comprises a high priority communication session; in response to detecting that the communication session comprises a high priority communication session, enhancing error protection for data of the high priority communication session; and communicating the enhanced data of the high priority communication session over the network to an endpoint.

An example as described alone or in combination with any of the other examples described above or below, wherein the detecting that the communication session comprises a high priority communication session comprises detecting that the communication session comprises an emergency call.

An example as described alone or in combination with any of the other examples described above or below, wherein the endpoint comprises an emergency dispatch network, and wherein the data comprises voice data of the emergency call communicated to the emergency dispatch network.

An example as described alone or in combination with any of the other examples described above or below, wherein enhancing error protection for data of the high priority communication session comprises enhancing error protection for the data of the high priority communication session at an application layer between the communication application and a communication service.

An example as described alone or in combination with any of the other examples described above or below, wherein the enhancing comprises enhancing the error protection for data of the high priority communication session by performing forward error correction on the data.

An example as described alone or in combination with any of the other examples described above or below, wherein performing forward error correction on the data comprises encoding the data of the high priority communication session with an error-correcting code that encodes the data with a maximum redundancy available for a communication channel between the communication application and the communication service.

An example as described alone or in combination with any of the other examples described above or below, wherein the encoding comprises dynamically adjusting a redundancy of the error-correcting code using punctured coding.

An example as described alone or in combination with any of the other examples described above or below, wherein the encoding comprises encoding the data of the high priority communication session using systematic forward error correction encoding.

An example as described alone or in combination with any of the other examples described above or below, wherein enhancing error protection for data of the high priority communication session comprises enhancing error protection for the data of the high priority communication session at a first layer and a second layer of the network, the first layer comprising an application layer between the communication application and a communication service and the second layer comprising a physical and link layer between the client device and a base station.

An example as described alone or in combination with any of the other examples described above or below, wherein the enhancing error protection for the data of the high priority communication session at the physical and link layer comprises instructing a device driver of the client device to communicate the data of the high priority communication session to the base station using one or more modified wireless parameters.

An example as described alone or in combination with any of the other examples described above or below, wherein the one or more modified wireless parameters comprise one or more of a lowest order modulation scheme, a lowest rate of error control coding, a low frequency band, a maximum power level, or channel bonding.

An example as described alone or in combination with any of the other examples described above or below, further comprising: periodically monitoring channel conditions of the network; determining and maintaining a reliability metric indicating the current channel conditions; and wherein the enhancing further comprises selecting an error protection enhancement level based on the reliability metric.

In one or more examples, a client device comprises: at least one processor; and one or more computer-readable storage media including instructions stored thereon that, responsive to execution by the at least one processor, implement a communication application, the communication application configured to perform operations comprising: receiving user input to initiate a communication session over a network; detecting that the communication session comprises a high priority communication session; in response to detecting that the communication session comprises a high priority communication session, enhancing error protection for data of the high priority communication session at a first layer and a second layer of the network, the first layer comprising an application layer between the communication application and a communication service and the second layer comprising a physical and link layer between the client device and a base station; and communicating the enhanced data of the high priority communication session over the network to an endpoint.

An example as described alone or in combination with any of the other examples described above or below, wherein the detecting that the communication session comprises a high priority communication session comprises detecting that the communication session comprises an emergency call.

An example as described alone or in combination with any of the other examples described above or below, wherein the endpoint comprises an emergency dispatch network, and wherein the data comprises voice data of the emergency call communicated to the emergency dispatch network.

An example as described alone or in combination with any of the other examples described above or below, wherein the enhancing comprises enhancing the error protection for data of the high priority communication session by performing systematic forward error correction on the data.

An example as described alone or in combination with any of the other examples described above or below, wherein performing systematic forward error correction on the data comprises encoding the data of the high priority communication session with an error-correcting code that encodes the data with a maximum redundancy available for a communication channel between the communication application and the communication service.

An example as described alone or in combination with any of the other examples described above or below, wherein the enhancing error protection for the data of the high priority communication session at the physical and link layer comprises instructing a device driver of the client device to communicate the data of the high priority communication session to the base station using one or more modified wireless parameters.

An example as described alone or in combination with any of the other examples described above or below, wherein the one or more modified wireless parameters comprise one or more of a lowest order modulation scheme, a lowest rate of error control coding, a low frequency band, a maximum power level, or channel bonding.

In one or more examples, a computer-implemented method, comprises: detecting, at a communication application implemented at a client device, user input to initiate an emergency call over a network; enhancing error protection for data of the emergency call; and communicating the enhanced data of the emergency call over the network to an emergency dispatch network.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computer-implemented method comprising:
   receiving, at a communication application implemented at a client device, user input to initiate a communication session over a network;
   detecting that the communication session comprises a high priority communication session;
   in response to detecting that the communication session comprises a high priority communication session, enhancing error protection for data of the high priority communication session at an application layer between the communication application and a communication service; and
   communicating the data of the high priority communication session with the enhanced error protection over the network to the communication service.

2. The computer-implemented method of claim 1, wherein the detecting that the communication session comprises a high priority communication session comprises detecting that the communication session comprises an emergency call.

3. The computer-implemented method of claim 2, wherein the communication service is running on an endpoint and the endpoint comprises an emergency dispatch network, and wherein the data comprises voice data of the emergency call communicated to the emergency dispatch network.

4. The computer-implemented method of claim 1, wherein the enhancing comprises enhancing the error protection for data of the high priority communication session by performing forward error correction on the data.

5. The computer-implemented method of claim 4, wherein performing forward error correction on the data comprises encoding the data of the high priority communication session with an error-correcting code that encodes the data with a maximum redundancy available for a communication channel between the communication application and the communication service.

6. The computer-implemented method of claim 5, wherein the encoding comprises dynamically adjusting a redundancy of the error-correcting code using punctured coding.

7. The computer-implemented method of claim 5, wherein the encoding comprises encoding the data of the high priority communication session using systematic forward error correction encoding.

8. The computer-implemented method of claim 1, wherein enhancing error protection for data of the high priority communication session comprises enhancing error protection for the data of the high priority communication session at a physical and link layer between the client device and a base station.

9. The computer-implemented method of claim 8, wherein the enhancing error protection for the data of the high priority communication session at the physical and link layer comprises instructing a device driver of the client device to communicate the data of the high priority communication session to the base station using one or more modified wireless parameters.

10. The computer-implemented method of claim 8, wherein the one or more modified wireless parameters comprise one or more of a lowest order modulation scheme, a lowest rate of error control coding, a low frequency band, a maximum power level, or channel bonding.

11. The computer-implemented method of claim 1, further comprising:
    periodically monitoring channel conditions of the network;
    determining and maintaining a reliability metric indicating the current channel conditions; and
    wherein the enhancing further comprises selecting an error protection enhancement level based on the reliability metric.

12. A client device, comprising:
    at least one processor; and
    one or more computer-readable storage media including instructions stored thereon that, responsive to execution by the at least one processor, implement a communication application, the communication application configured to perform operations comprising:
    receiving user input to initiate a communication session over a network;
    detecting that the communication session comprises a high priority communication session;
    in response to detecting that the communication session comprises a high priority communication session, enhancing error protection for data of the high priority communication session at a first layer and a second layer of the network, the first layer comprising an application layer between the communication application and a communication service and the second layer comprising a physical and link layer between the client device and a base station; and
    communicating the enhanced data of the high priority communication session to the communication service.

13. The client device of claim 12, wherein the detecting that the communication session comprises a high priority communication session comprises detecting that the communication session comprises an emergency call.

14. The client device of claim 13, wherein the communication service is running on an endpoint, and the endpoint comprises an emergency dispatch network, and wherein the data comprises voice data of the emergency call communicated to the emergency dispatch network.

15. The client device of claim 12, wherein the enhancing comprises enhancing the error protection for data of the high priority communication session by performing systematic forward error correction on the data.

16. The client device of claim 15, wherein performing systematic forward error correction on the data comprises encoding the data of the high priority communication session with an error-correcting code that encodes the data with a maximum redundancy available for a communication channel between the communication application and the communication service.

17. The client device of claim 12, wherein the enhancing error protection for the data of the high priority communication session at the physical and link layer comprises instructing a device driver of the client device to communicate the data of the high priority communication session to the base station using one or more modified wireless parameters.

18. The client device of claim 17, wherein the one or more modified wireless parameters comprise one or more of a lowest order modulation scheme, a lowest rate of error control coding, a low frequency band, a maximum power level, or channel bonding.

* * * * *